Patented Nov. 28, 1944

2,363,561

UNITED STATES PATENT OFFICE 2,363,561

CYCLOHEXYL-AMINE SALTS

Frank B. Smith and John N. Hansen, Midland, Mich., assignors to The Dow Chemical Company, Midland, Mich., a corporation of Michigan No Drawing. Application June 15, 1940,
Serial No. 340,844

8 Claims. (Cl. 167—31)

This invention relates to amine salts and to parasiticidal compositions in which they are employed as active toxicants. The invention is particularly concerned with certain cyclohexyl-amine salts of polyhalo-phenols having the following formula:

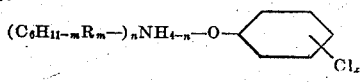

wherein $m$ and $n$ are integers not greater than 2, R represents hydrogen, halogen, aryl, aralkyl, cycloalkyl, or an alkyl radical containing from 1 to 8 carbon atoms, inclusive, and $x$ is an integer from 3 to 5, inclusive. We have prepared representative members of the above identified group of compounds and found them to be high melting crystalline solids difficultly soluble in both water and common organic solvents. These compounds are stable to light and air, and not appreciably affected by carbon dioxide. They are valuable as parasiticides and as intermediates for the preparation of more complex organic derivatives.

While the invention is directed to the class of compounds described above, a preferred embodiment of the cyclohexyl-ammonium radical is defined by the following formula:

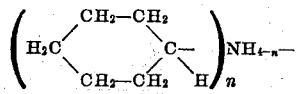

wherein $n$ represents 1 or 2.

The foregoing compounds may be prepared by reacting a suitable amine, such as cyclohexylamine, (methylcyclohexyl)-amine, or dicyclohexyl-amine, with a tri-, tetra-, or penta-chlorophenol. The reaction is conveniently carried out in benzene, chlorobenzene, alcohol, or the like. Substantially equimolecular proportions of the amine and polychloro-phenol have been found to give the desired salts in good yield, although any suitable amounts may be employed. Where an excess of one or the other reactant is present in the final product, separation is readily accomplished by extraction with benzene or other solvent for the chloro-phenol and amine in which the amine salt is difficultly soluble. The operating temperatures are not critical, although reduced amounts of solvent are required at temperatures above 40° C. The reaction can be conveniently carried out at any desired temperature up to the boiling temperature of the reaction mixture. In operation, the amine is added to a polychlorophenol solution, whereby the insoluble amine salt of the phenol precipitates rapidly out of the mixture with the evolution of considerable heat. To ensure the formation of a relatively homogeneous product and to minimize occlusion, the amine is preferably added portionwise with stirring over a short period of time. Following the completion of the reaction, the mixture is filtered or otherwise manipulated to separate out the insoluble amine salt which may be further purified by washing with small amounts of solvents, such as benzene, chlorobenzene, and the like. The amine salt obtained as a residue from the separation is then dried at a temperature calculated to volatilize residual traces of solvent.

An alternate method consists of carrying out the reaction in water solution. In this modification of the procedure a sodium salt of the selected phenol is reacted with the hydrochloride or other inorganic acid salt of the cyclohexylamine, it being sufficient to contact aqueous dispersions or solutions of the reactants one with the other. The cyclohexyl-amine salt so obtained is sufficiently insoluble in water that there is no problem of separation and isolation.

The following examples set forth certain embodiments of the invention but are not to be construed as limiting the same.

Example 1

19.75 grams (0.1 mole) of 2.4.5-trichloro-phenol was dispersed in 25 milliliters of benzene and the mixture heated to its boiling temperature and under reflux. 18.1 grams (0.1 mole) of dicyclohexyl-amine was thereafter added portionwise to the hot phenol solution with stirring over a period of approximately 15 minutes. After about half of the amine had been added, crystallization of the addition salt began to take place and considerable heat of reaction was developed. The reaction was substantially complete within about 20 minutes after the addition of the last of the dicyclohexyl-amine. The mixture was then cooled and filtered whereby a crude dicyclohexylamine salt product was recovered as a residue. This product was washed twice with 25 milliliter portions of benzene and dried at 70° C. to obtain 33 grams of the dicyclohexyl-amine salt of 2.4.5-trichlorophenol as a white crystalline solid melting at 145° C. and having a solubility in water of 0.0397 gram per 100 milliliters at 25° C. The solubility of this compound in heavy mineral oil and kerosene is 0.8 gram and 1.7 grams, respectively, per 100 grams solvent at 25° C.

Example 2

In a similar manner other polychloro-phenols were reacted with dicyclohexyl-amine to obtain the following compounds:

Dicyclohexyl-amine salt of 2.4.6-trichloro-phenol as a white crystalline material melting at 164.5°–5.5° C. and soluble to the extent of 0.069 gram per 100 milliliters of water at 25° C.

Dicyclohexyl-amine salt of 2.3.4.6-tetrachloro-phenol as a white crystalline solid melting at 194°–5° C. and soluble in water to the extent of 0.0317 gram per 100 milliliters at 25° C.

Dicyclohexyl-amine salt of pentachloro-phenol as a white crystalline compound melting at 221°–2° C. and having a solubility in water of 0.0123 gram per 100 milliliters at 25° C. This compound has a solubility of less than 0.4 gram and less than 1.0 gram per 100 grams of heavy mineral oil and kerosene, respectively, at 25° C.

By substituting other cyclohexyl-amines for those set forth in the examples, the corresponding salts of mono-cyclohexyl-amine, mono- and di-(2-methyl-cyclohexyl)-amine, mono- and di-(3-bromo-cyclohexyl)-amines, mono- and di-(3.5-dimethyl-cyclohexyl)-amines, mono- and di-(3-methyl-cyclohexyl)-amines, mono- and di-(2-chloro-4-methyl-cyclohexyl)-amines, mono- and di-(3-phenyl-cyclohexyl)-amines, mono- and di-(2-benzyl-cyclohexyl)-amines, mono- and di-(2-ethyl-cyclohexyl)amines, mono- and di-(2.4-ditertiarybutyl-cyclohexyl)-amines, mono- and di-(4 - cyclohexyl - cyclohexyl) - amines, and the like may be obtained.

Many synthetic organic compounds have been suggested as parasiticides and more particularly as substitutes for lead, arsenic, and copper-containing inorganic compounds. Frequently such synthetic derivatives have been found to be injurious to plant foliage so that their use must be carefully controlled. Because of their high water solubility and incompatibility with other parasiticidal materials, phenolates generally have not been found particularly suited as insecticidal toxicants.

According to the present invention, the addition salts of the cyclohexyl-amines with the tri-, tetra-, and penta-chloro-phenols are employed as insecticidal toxicants. We have found that compositions comprising these products may be applied to growing foliage without material injury thereto. This desirable property is believed to result from the low solubilities of the present compounds.

The new compounds may be employed as constituents of insecticidal sprays and dusts to be contacted with growing vegetation. An advantage in the use of these salts lies in the fact that their low water solubility and stability permits their use in combination with common organic and inorganic insecticidal toxicants which heretofore have been considered incompatible with phenolic compounds. The new amine salts may be compounded with carriers, such as diatomaceous earth, bentonite, talc, sulphur, wood flours, inorganic phosphates, and lime, to form agricultural dusts. If desired, such dusts may be employed as concentrates and diluted with or suspended in water or other inert liquid carrier to form sprays. The amine addition salts may also be incorporated with various wetting, dispersing, and sticking agents and subsequently diluted to produce dust or spray compositions in which the amine salt is present in any desired concentration. In the preparation of concentrates, from about 5 to about 80 per cent of the amine salt is commonly employed. The concentration of the amine salt in spray or dust compositions on application to living vegetation is preferably between 0.01 per cent and 5 per cent by weight. The particular adaptation in which the amine salt is employed and the concentration thereof in the final composition are dependent upon the type of insect to be controlled and the circumstances under which such control is to be accomplished.

Although relatively insoluble in oil and petroleum distillates generally, the amine salts may be employed in combination with oil emulsions. They may also be employed in water suspension with or without an additional emulsifying, wetting, or dispersing agent. In a further modification where it is desired to impregnate solid carriers with the amine salt, the carrier may be introduced into the salt reaction mixture and the amine salt precipitated directly in and on the carrier surface. Similarly, a carrier, such as wood flour, bentonite, diatomaceous earth, and the like, may be wetted with a solution of a tri-, tetra-, or penta-chloro-phenol as in toluene and thereafter contacted with a suitable solution of the cyclohexyl-amine whereby the desired compound is formed in situ.

The amine salts may also be incorporated in other standard type insecticidal compositions, either as the sole toxic ingredient of such composition or in combination with such materials as inorganic pigments, organic dyes, lead arsenate, pyrethrum, cryolite, rotenone, organic thiocyanate, sulphur, copper sprays, and related compounds.

The following examples illustrate the invention with respect to various ways in which the compounds may be employed as parasiticidal toxicants:

Example 3

The following concentrates were prepared:

|  | Parts by weight |
|---|---|
| Composition 1: | |
| Dicyclohexyl-amine salt of 2.4.5-trichloro-phenol | 20 |
| Diatomaceous earth | 80 |
| Composition 2: | |
| Dicyclohexyl-amine salt of 2.4.6-trichloro-phenol | 20 |
| Diatomaceous earth | 80 |
| Composition 3: | |
| Dicyclohexyl-amine salt of 2.3.4.6-tetrachloro-phenol | 20 |
| Diatomaceous earth | 80 |
| Composition 4: | |
| Dicyclohexyl-amine salt of pentachloro-phenol | 20 |
| Diatomaceous earth | 80 |

These compositions were prepared by grinding the materials in a ball mill to form homogeneous mixtures in which the amine salts had an average particle size of from 1 to 5 microns diameter. Each such composition was then dispersed in water in the amount of 15 pounds per 100 gallons of spray and applied to insect infested vegetation.

The aqueous dispersion of composition 1 was found to give a 52 per cent control of the Mexican beetle in two days. Magnesium arsenate at a concentration of 2 pounds per 100 gallons of spray controlled only 40 per cent of the pests.

When applied to the young foliage of soya bean in a tolerance test, the amine salt composition was substantially the equivalent of lead arsenate of 3 pounds per 100 gallons, little, if any, injury to the growing plant resulting.

The aqueous dispersion of composition 2 was compared with lead arsenate at 3 pounds per 100 gallons of spray to determine plant injury. The two compositions were found to be substantially identical in their effect upon soya bean foliage.

The aqueous dispersion of composition 3, when applied for the control of Colorado potato beetle, gave a kill of 64 per cent in 3 days, while lead arsenate at 3 pounds per 100 gallons killed 73 per cent. The dicyclohexylamine salt caused yellowing of 5 per cent of the leaves contacted therewith, while the lead arsenate composition was injurious to 20 per cent.

The aqueous dispersion of composition 4 in a tolerance determination produced a slight fading of about 5 per cent of soya bean leaves in 12 days. In a concurrent test of lead arsenate at 3 pounds per 100 gallons, 10 per cent of the leaves of soya bean were badly burned.

*Example 4*

Moth-proofing tests were carried out with solutions of the various cyclohexyl-amine salts in methyl-ethyl ketone to determine their efficiency against larvae of black carpet beetle (*Attagenus piceus*). This insect and its larvae attack woolens, furs, and other materials, and are particularly destructive to fabrics used in upholstered furniture, and to woolen carpets and rugs. In each such determination a number of samples of wool cloth were saturated with a 4 per cent solution of the cyclohexyl-amine salt in methyl-ethyl ketone, thereafter pressed to remove excess treating solution and dried. Each of these samples was then infested with 5 larvae of the black carpet beetle and placed in a closed cardboard box. The cloth was examined from time to time to determine the amount of feeding or other attack directly attributable to the larvae. Similar tests were simultaneously carried out on untreated samples of the woolen cloth, both control and test samples being incubated after infestation at temperatures of 80°–90° F. and at a relative humidity of 70–75 per cent. Examination of incubated samples showed that with the dicyclohexyl-amine salt of 2.4.6-trichloro-phenol there was no feeding in 3 weeks and that 60 per cent of the carpet beetle larvae were dead. The dicyclohexyl-amine salt of 2.4.5-trichloro-phenol prevented feeding over the 3-weeks period and resulted in a mortality of 80 per cent of the beetle larvae. The dicyclo-hexyl-amine salt of pentachloro-phenol did not kill the larvae but prevented feeding over the 3-weeks period. The dicyclohexyl-amine salt of 2.3.4.6-tetrachlorophenol prevented feeding for 3 weeks and killed 20 per cent of the larvae. In check determinations where the woolen cloth was impregnated with methyl-ethyl ketone alone, there was heavy feeding by the larvae throughout the incubation period.

The woolen pieces impregnated with the cyclohexylamine salts were protected from larval attack over a long period of time, and the solubility of the cyclohexyl-amine salts was such that the mothicidal characteristics were retained by the cloth samples even after washing and dry cleaning.

*Example 5*

Dusting compositions comprising amine salts as toxic ingredients are illustrated by the following:

Parts by weight

Composition 5:
 Monocyclohexyl-amine salt of 2.3.4.6-tetrachloro-phenol _____ 1
 Sulphur _____ 99
Composition 6:
 Di-(2-methyl-cyclohexyl)-amine salt of 2.4.5-trichloro-phenol _____ 2
 Walnut shell flour _____ 98
Composition 7:
 Monocyclohexyl-amine salt of pentachloro-phenol _____ 5
 Diatomaceous earth _____ 95

The above and similar compositions may be applied with standard dusting equipment for the control of codling moth and other chewing insects.

*Example 6*

A concentrate useful for the preparation of combined insecticidal and fungicidal sprays is as follows:

Parts by weight

Composition 8:
 Dicyclohexyl-amine salt of 2.4.5-trichloro-phenol _____ 80
 Sodium salt of sulphonated lauryl alcohol _____ 20

The above mixture may be suspended in water in amount of from 0.5 to 5.0 pounds per 100 gallons to form aqueous dispersions suitable for application to the trunks and branches of trees during the dormant period. Such aqueous compositions are also of value for spraying the ground adjacent to tress and shrubs, particularly after leaf fall. When applied in this manner, the amine salt of the trichloro-phenol serves as an active toxicant not only against insect pests but also aids in the control of various spore-forming fungi.

Other modes of applying the principle of our invention may be employed instead of those explained, change being made as regards the materials or their amounts employed, provided the compounds or compositions stated by any of the following claims or their equivalent be employed.

We therefore particularly point out and distinctly claim as our invention:

1. A compound having the formula

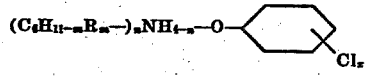

wherein m and n are integers not greater than 2, R represents a member of the group consisting of hydrogen, halogen, aryl, aralkyl, cycloalkyl, and those alkyl radicals containing from 1 to 8 carbon atoms, inclusive, and x is an integer from 3 to 5, inclusive.

2. A compound having the formula

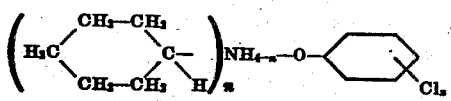

wherein n is an integer not greater than 2, and x is an integer from 3 to 5, inclusive.

3. A compound having the formula

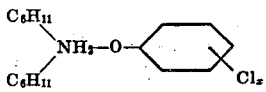

wherein $x$ is an integer from 3 to 5, inclusive.

4. The dicyclohexyl-amine salt of a trichlorophenol.

5. The dicyclohexyl-amine salt of tetrachlorophenol.

6. The dicyclohexyl-amine salt of pentachlorophenol.

7. An insecticidal and fungicidal mixture of diatomaceous earth with a compound having the formula

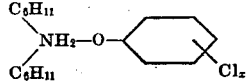

wherein $x$ is an integer from 3 to 5, inclusive.

8. An insecticidal and fungicidal composition including a carrier and as a toxic ingredient a compound having the formula

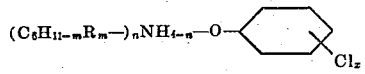

wherein $m$ and $n$ are integers not greater than 2, R represents a member of the group consisting of hydrogen, halogen, aryl, aralkyl, cycloalkyl, and those alkyl radicals containing from 1 to 8 carbon atoms, inclusive, and $x'$ is an integer from 3 to 5, inclusive.

FRANK B. SMITH.
JOHN N. HANSEN.